United States Patent
Kalley et al.

(10) Patent No.: US 6,890,080 B2
(45) Date of Patent: May 10, 2005

(54) AIR PURGE SYSTEM FOR OPTICAL SENSOR

(75) Inventors: Eugene F. Kalley, St. Charles, IL (US); Sam Paris, Chicago, IL (US); Tommy C. Tam, Chicago, IL (US); Amilio Donado, Des Plaines, IL (US)

(73) Assignee: Ircon, Inc., Niles, IL (US)

( * ) Notice: Subject to any disclaimer, the term of this patent is extended or adjusted under 35 U.S.C. 154(b) by 45 days.

(21) Appl. No.: 10/348,639

(22) Filed: Jan. 22, 2003

(65) Prior Publication Data

US 2003/0142403 A1 Jul. 31, 2003

Related U.S. Application Data

(60) Provisional application No. 60/351,759, filed on Jan. 25, 2002.

(51) Int. Cl.[7] .............................. B08B 5/02; G02B 5/00
(52) U.S. Cl. ...................................... 359/509; 507/900
(58) Field of Search ................................. 359/509, 900; 374/125

(56) References Cited

U.S. PATENT DOCUMENTS

| | | | | |
|---|---|---|---|---|
| 2,534,448 A | | 12/1950 | Jantsch | |
| 3,584,509 A | * | 6/1971 | Compton et al. | 374/123 |
| 3,628,028 A | * | 12/1971 | Thorsheim | 250/576 |
| 3,833,305 A | * | 9/1974 | Porter et al. | 356/438 |
| 4,118,985 A | * | 10/1978 | Compton | 374/125 |
| 4,266,142 A | * | 5/1981 | Crawford | 250/559.01 |
| 4,687,892 A | * | 8/1987 | Brolin et al. | 219/611 |
| 4,711,986 A | * | 12/1987 | Lillquist et al. | 219/130.01 |
| 5,069,397 A | * | 12/1991 | Haslund | 244/1 R |
| 5,115,342 A | * | 5/1992 | Rowe et al. | 359/509 |
| 5,359,907 A | * | 11/1994 | Baker et al. | 73/865.5 |
| 5,374,399 A | * | 12/1994 | Tsukamoto et al. | 422/91 |
| 5,374,992 A | * | 12/1994 | Pye et al. | 356/439 |
| 5,442,155 A | * | 8/1995 | Nihei et al. | 219/130.01 |
| 5,590,537 A | | 1/1997 | Vogel | |
| 6,641,301 B2 | * | 11/2003 | Pompei | 374/125 |

FOREIGN PATENT DOCUMENTS

| | | |
|---|---|---|
| FR | 1553985 | 1/1969 |
| JP | 04-084687 A * | 3/1992 |
| WO | WO99/00531 | 1/1999 |

OTHER PUBLICATIONS

IRCON, Inc., Department of Animal Ecology University of Lund, "The Lund Wind Tunnel," http://orn-lab.ekol.lu.se/birdmigration/windtunnel/undwind.html., 2 pages, (Jan. 11, 2002).
IRCON, Inc., Technical Solutions, "Temperature Errors Caused by Change in Product Emissivity," 4 pages, (1998)., TS100.
IRCON, Inc., Company Overview, "About ICRON," http://www.ircon.com/about_ircon.html., 1 page, (Jan. 16, 2002).
IRCON, Inc., Products, "Scanir II," http://www.ircon.com/scanir.html., 5 pages, (Jan. 16, 2002).
IRCON, Inc., Tech Guide, "Application Notes," http://www.ircon.com/appnotes.html., 1 page, (Jan. 18, 2002).
IRCON, Inc., Tech Guide, "Technical Solutions," http://www.ircon.com/techsolution.html., 1 page (Jan. 18, 2002).
IRCON, Inc., Products, "Product Application Notes," http://www.ircon.com/prodappnotes.html., 1 page, (Jan. 18, 2002).
PCT International Search Report; PCT/US03/02212, dated May 12, 2003.

* cited by examiner

Primary Examiner—John Juba, Jr.
(74) Attorney, Agent, or Firm—Marshall, Gerstein & Borun LLP

(57) ABSTRACT

An air purge system for an optical sensor is disclosed. The air purge system includes a two sided lens having an optical sensor positioned on the first side and a fluid stream on the second side. The air purge system further includes, a plenum having an inlet, an array of parallel channels and an outlet, whereby the array of parallel channels, is disposed between the inlet and the outlet. The outlet is positioned on the second side of the housing and may be adapted to direct a fluid stream substantially parallel to the second side of the lens.

15 Claims, 5 Drawing Sheets

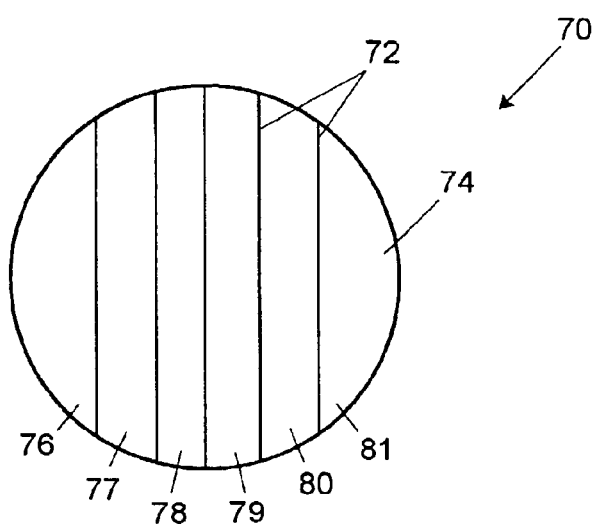
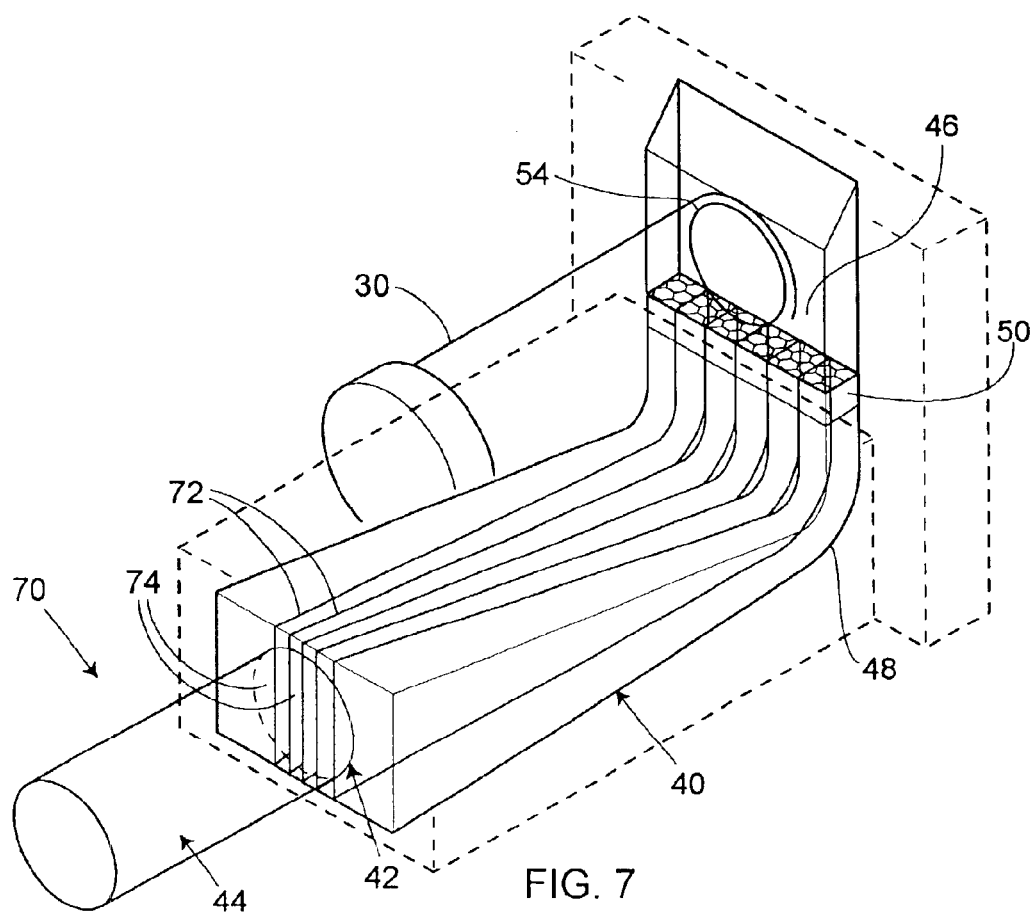

AIR PURGE SYSTEM FOR OPTICAL SENSOR

RELATED APPLICATION DATA

The present application is a non-provisional application based on co-pending provisional application 60/351,759, which was filed on Jan. 25, 2002.

FIELD OF THE DISCLOSURE

The disclosure relates to optical sensor system and, more particularly, relates to optical sensor system having an air purge.

BACKGROUND OF THE DISCLOSURE

Optical temperature detection devices measure the light radiated by objects to determine the temperature of the objects, without contacting the object. Such devices have great flexibility and can be utilized in various applications, including but not limited to, measuring critical temperatures during glass and plastic manufacturing processes. Depending on the application, optical temperature detection devices can also be manufactured with different operating parameters, such as portability, range, accuracy and size.

Optical temperature detection devices have several advantages over other temperature detection devices that contact the object, including such advantages as, the response time being vastly improved, and eliminating the need to make good contact with the object. Unfortunately, along with the above named benefits, come several disadvantages, including, but not limited to, inaccurate readings due to contamination of the optical lens or window. The contamination of the optical lens or window prevents the optical sensor from having a needed unobstructed line of sight to the object, hence preventing the optical sensor from properly reading the temperature of the object.

The contamination of the optical lens or window can occur in many ways. Most obvious and easiest to prevent is the actual touching and scraping of the lens or window with foreign objects such as fingers and tools. Less obvious and more difficult to prevent is the deposit of contaminants on the lens or window, placed there by the surrounding ambient air.

There have been several attempts made in the art to prevent the deposit of contaminants on the lens or window, including purging the area proximate to the lens or window with forced gas. More specifically, the purging process has been accomplished by placing a hollow housing over the area exposed to the lens and forcing through an outlet at the base of the housing near the lens, an air stream that creates a contaminant free area in front of the lens by forcing all of the ambient air away from the lens. Although somewhat effective, the application of this purging process is limited to optical sensors with narrow field of views.

Similar attempts to rid the lens of contaminants have been made by directing a small stream of gas directly toward the lens. This process and apparatus, even though useable on a great variety of lenses and taking up relatively little space, is limited in effectiveness in that the generated stream of gas has a tendency to commingle with ambient air as it approaches the lens, thereby allowing the lens to once again become contaminated with ambient air particles.

To overcome the problems of commingling air, others in the art have attempted to create a contaminant free area in front of the lens by forcing a laminar gas flow past the lens. Even though forcing a laminar gas flow past the lens has been effective, other important variables had to be sacrificed. For example, due to the large area needed for housing the length of conduit necessary to produce such a laminar gas flow, the footprints of such devices become so large as to be unusable in many applications.

SUMMARY OF THE DISCLOSURE

In accordance with one aspect of the disclosure, an improved optical sensor air purge system, capable of preventing ambient air and contaminants from contacting the lens while being in a confined area, is provided.

In accordance with another aspect of the disclosure an air purge system for an optical sensor is provided. The air purge system includes a two sided lens for the optical sensor having positioned on one side the optical sensor and on the other side a fluid stream. The air purge system further includes a plenum having an inlet, an outlet, and an array of parallel channels that may be disposed between the inlet and the outlet. The outlet is positioned within the housing and adapted to direct the fluid stream substantially parallel to the second side of the lens.

In accordance with yet another aspect of the disclosure, a method of purging air in front of an optical sensor is provided. The method includes providing a lens having a first side and a second side, a plenum including an inlet, an array of parallel channels and an outlet, and an optic sensor located on the first side of the lens. The method further includes changing the fluid stream from a laminar fluid stream to a turbulent fluid stream, channeling the turbulent fluid stream through the array of parallel channels, thereby changing the turbulent fluid stream to a substantially laminar fluid stream, and exiting the fluid stream substantially parallel to the second side of the lens.

BRIEF DESCRIPTION OF THE DRAWINGS

FIG. 6 is a cross sectional view of a diffuser, at an inlet of a plenum, as constructed in accordance with the teachings of the disclosure, taken along line 6—6 of FIG. 1;

FIG. 7 is a perspective view of another embodiment of an air purge system as constructed in accordance with the teachings of the disclosure.

Figure 1:
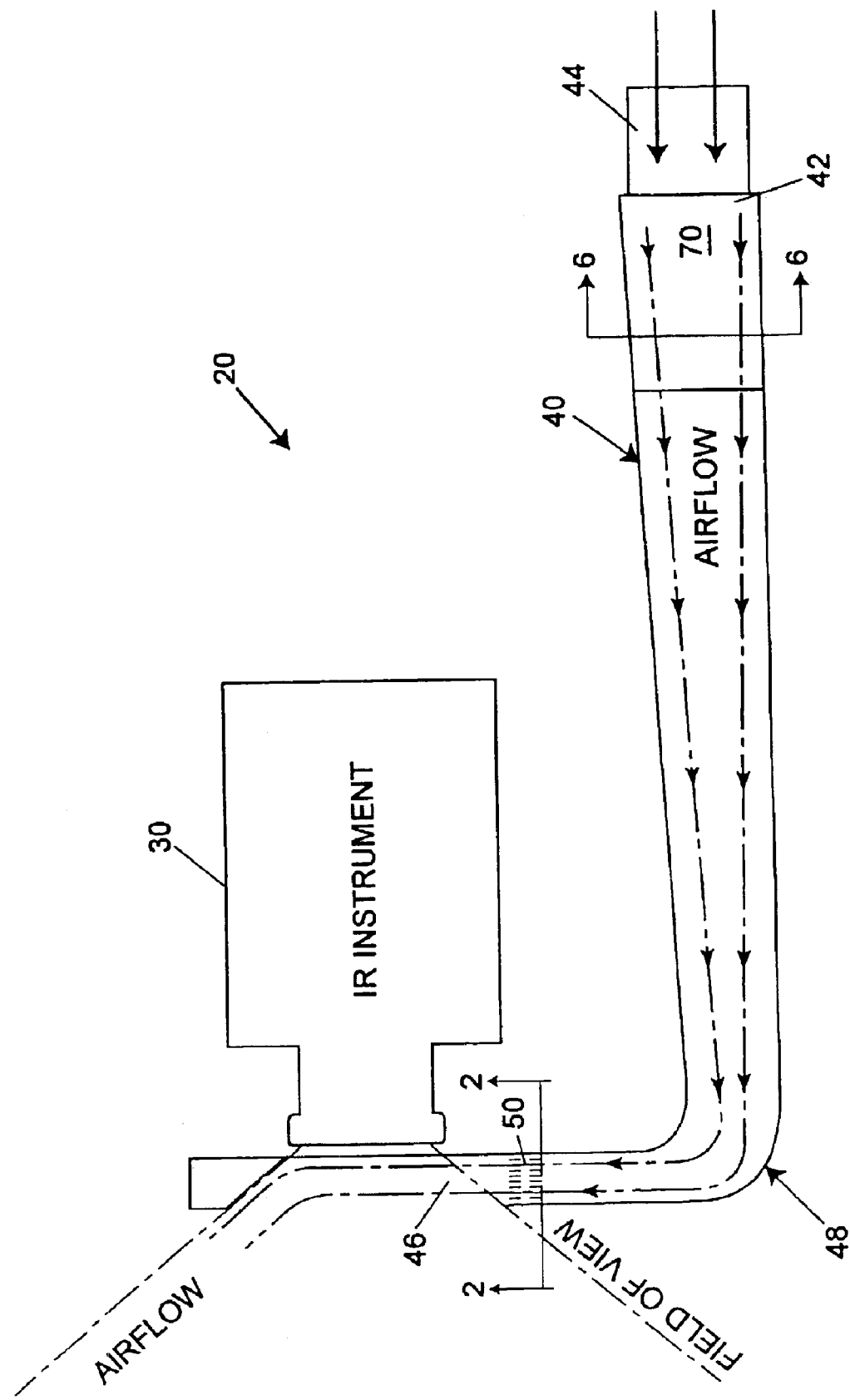
FIG. 1 is schematic of one embodiment of an air purge system as constructed in accordance with the teachings of the disclosure.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION

Figure 8:
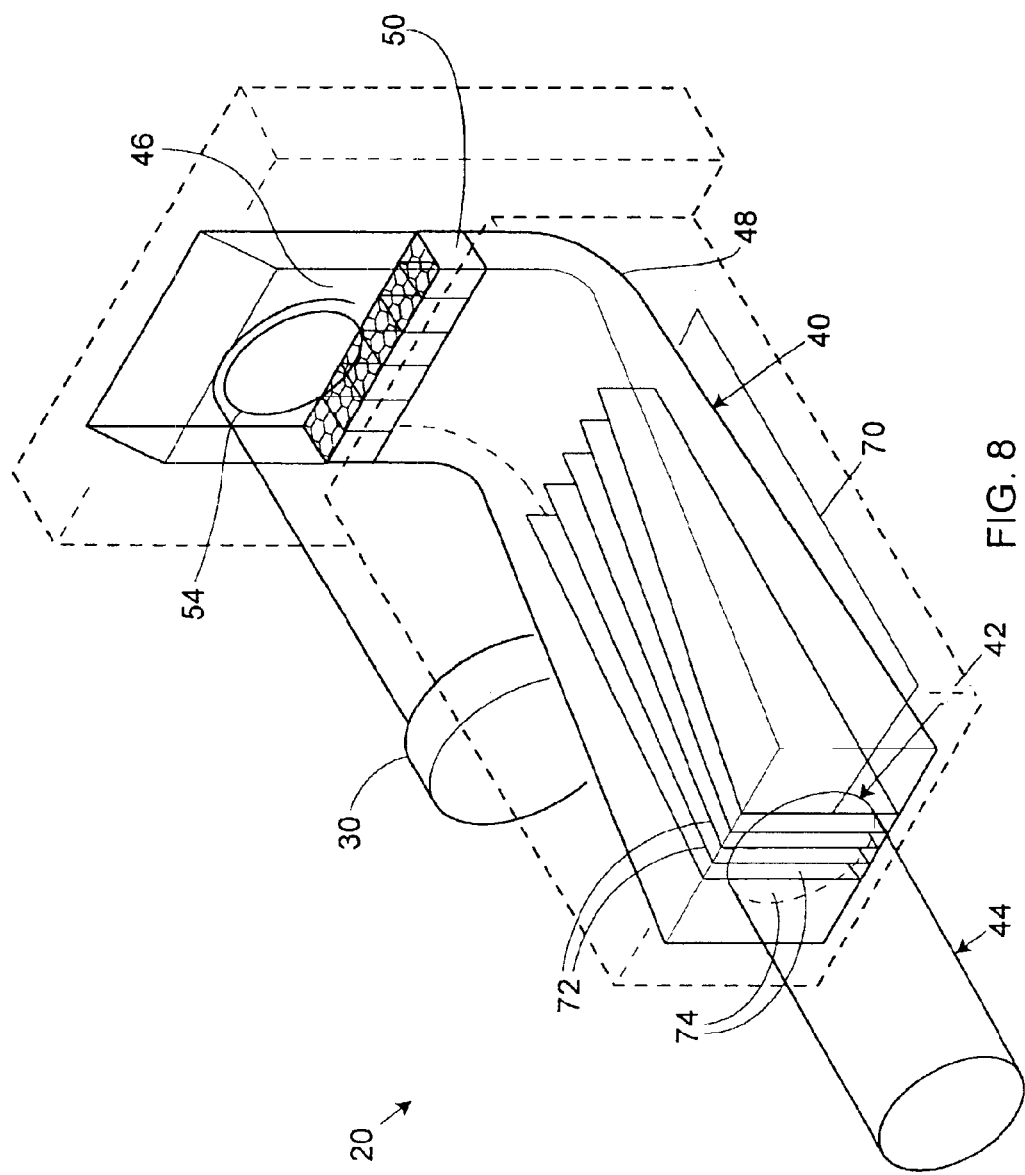
FIG. 8 is a perspective view of the air purge system of FIG. 1.

Referring now to the drawings, and with specific reference to FIGS. 1 and 8, an air purge system as constructed in accordance with the teachings of the disclosure is generally depicted by reference numeral 20. As shown therein, the air purge system 20 includes a sensor 30, a plenum 40 having an inlet 42 and an outlet 46, a bend or elbow 48, an array of parallel channels 50, and a diffuser 70.

In one exemplary embodiment, the plenum 40 may be of a generally rectangular shape, with the inlet 42 adapted to receive a source e.g. fan, blower, impeller, capable of providing a forced fluid stream. In other exemplary embodiments, the shape of the plenum 40 may, however, be square, round, oval or any other shape able to accomplish the intended purpose. The inlet 42 may include a step, from which a male adapter 44 may protrude. The male adapter 44 may be smaller in perimeter size than the inlet 42, so that a flexible tube (not shown) may be inserted over the male adapter 44. Furthermore, the size of the plenum 40, at the inlet 42, may also be larger than the size of the plenum 40 at the outlet 46.

Depending on the application and space requirements, the plenum 40 may also be manufactured from different types of materials, ranging from rigid metal, to flexible plastics. Similarly, the fluid used may be a gas such as filtered air, but some applications may require a cleaner or inert gas, such as Nitrogen. The flow of gas may experience a change in direction between the inlet 42 and the array of parallel channels 50, such as at the bend 48. It should be noted at this point, that the bend 48 in the plenum 40 is the result of reducing the footprint of the air purge system 20, and may not otherwise need to be utilized, if space is not of importance.

Figure 3:
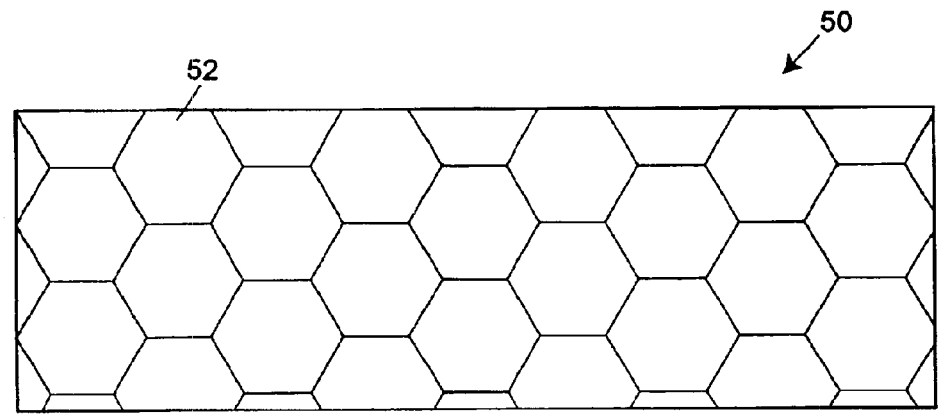
FIG. 3 is a cross-sectional view of the array of parallel channels in FIG. 1, taken along line 2—2 of FIG. 1.
Figure 4:
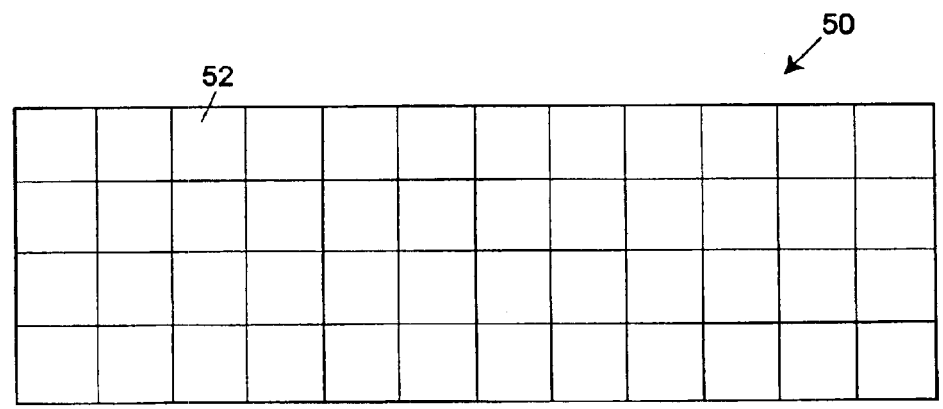
FIG. 4 is a cross-sectional view similar to FIG. 3, but depicting an alternative of the array of parallel channels.
Figure 5:
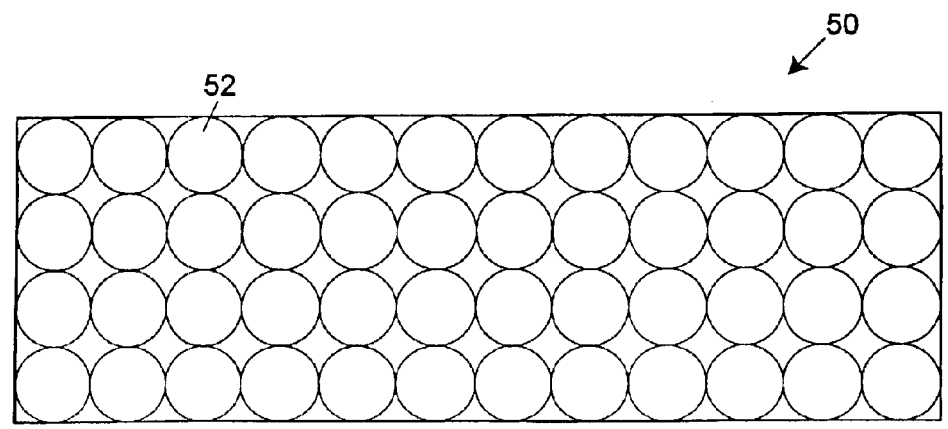
FIG. 5 is a cross-sectional view similar to FIG. 3, but depicting an alternative of the array of parallel channels.

The bend 48 in the plenum 40, as show in FIGS. 1, 7 and 8, may create approximately a ninety degree angle. It should also be noted, however, that the bend 48 in FIGS. 1, 7 and 8 is merely representative of the many angles and directions in which a bend is possible of being made. Accordingly, the bend possibilities are not limited to two dimensions, but may also include any three dimensional possibility. Once again, in the direction of flow, disposed between the outlet 46 and the bend 48 may be the array of parallel channels 50. The array of parallel channels 50 may be located within the plenum 40, but it may be adapted to connect to the plenum 40 as a connector between the plenum 40 and the outlet 46. The array of parallel channels 50 may be of a generally rectangular shape, but may also be square, round, oval or any other shape able to accomplish the intended purpose. The cross-section of the array of channels 50, as shown in FIGS. 3–5, may include a plurality of channels 52 located parallel to the direction of the air flow, and may be of various shapes and sizes. The channels 52 may combine to create a honeycomb configuration (FIG. 3), a grid configuration (FIG. 4), a tube configuration (FIG. 5), or any other configuration that would be suitable for its intended purpose. Similarly, the array of parallel channels 50, may be created by a screen, or by a combination of a screen and other parallel channels.

As mentioned above, the array of parallel channels 50 may be disposed between the bend 48 and the outlet 46, but the array of parallel channels 50 may also be located at the end of the plenum 40, such that the end of the array of parallel channels 50 also serves as the outlet 46 of the plenum 40. Alternatively, the plenum 40 may continue past the array of parallel channels 50, in the direction of flow that is now perpendicular to the line of sight of the optical sensor 30, having disposed at the end, the outlet 46.

Figure 2:
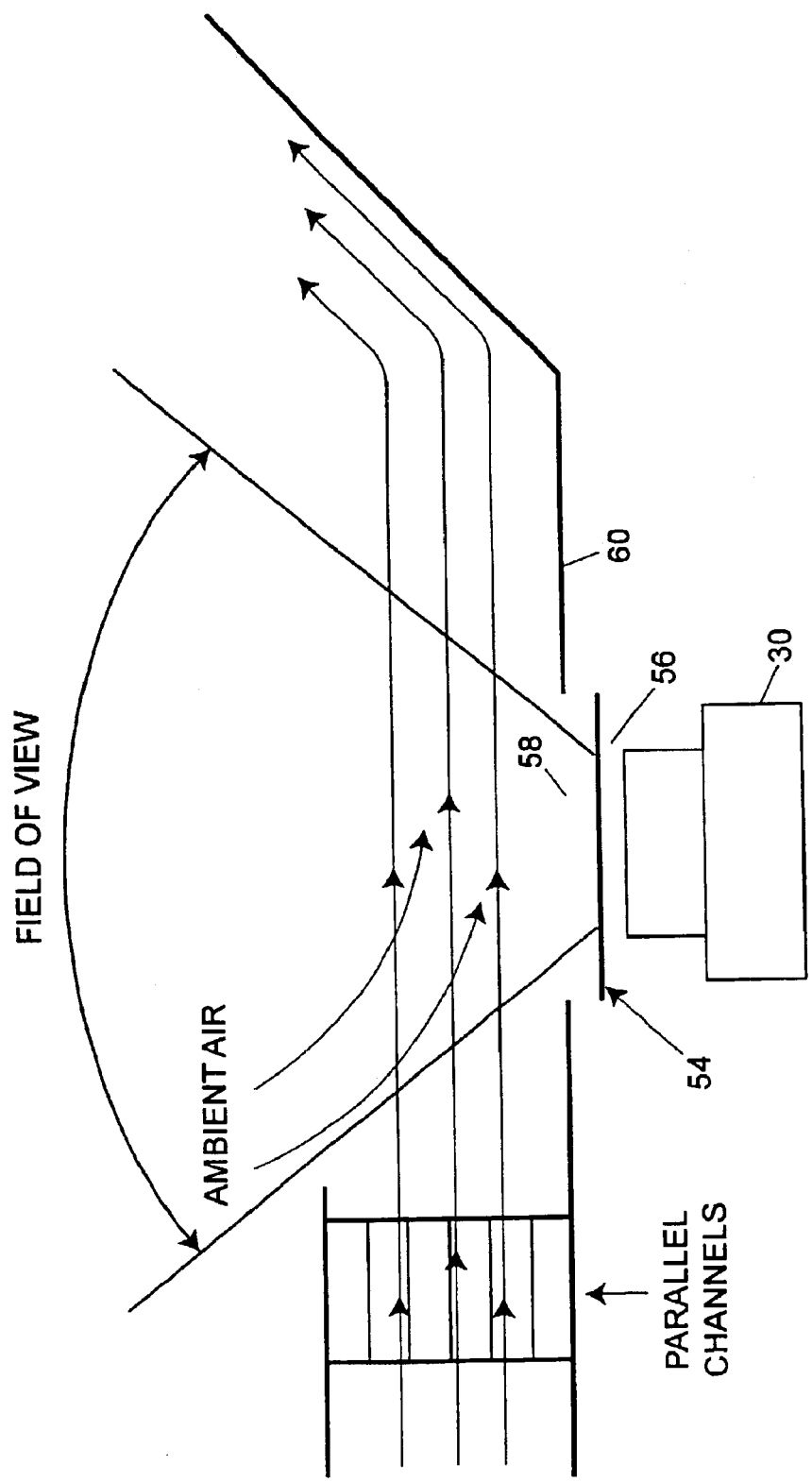
FIG. 2 is a schematic representation of a portion of the air purge system depicted in FIG. 1.

In one exemplary embodiment, the optical sensor 30, as shown in FIGS. 2 and 8, may include a lens (or window) 54 having a first side 56 and a second side 58. The lens 54 of the optical sensor 30 may also be an integral part of the optical sensor 30. Located on the second side 58 of the lens 54 is a housing 60, and located on the first side 56 of the lens 54 is the optical sensor 30. Therefore, the line of sight, and the field of view, originate at the optical sensor 30, and proceed from the first side 56 of the lens, through the lens 54, to the ambient air. The outlet 46 at the plenum 40, or alternatively at the array of parallel channels 50, is preferably located prior to the field of view of the optical sensor 30, such that the flow of gas exits the outlet 46 prior to passing in front of the lens 54, of the optical sensor 30. Similarly, the outlet 46 of the plenum 40 may be located a distance away from the lens 54, perpendicular to the flow of gas, such that the flow of gas prevents, rather than induces, the deposit of contamination on the lens 54.

In one exemplary embodiment, the diffuser 70 may include one or more diffuser vanes 72 creating one or more air passages 74. For example, as shown in FIG. 6, the diffuser 70 may include five diffuser vanes 72 forming six air passages 76, 77, 78, 79, 80 and 81.

In one exemplary embodiment, the distance between the diffuser vanes 72 may be calculated to create air passages having substantially equal areas, thereby allowing for the equal distribution of air amongst the various air passages 74. For example, as seen in FIG. 6, the plenum 40 may have a diffuser 70 including a plurality of air passages 74 that are sized to provide a substantially equal airflow within each of the air passages 74. More specifically, the plenum 40 may have a width of approximately 6.5 inches and the inlet 42 may have an inner diameter of approximately 1.75 inches. The air passages 76, 77, 78, 79, 80 and 81 may have substantially equal areas of approximately 0.4 square inches by creating a space approximately 0.232 inches wide between the inner two air passages 78, 79, by creating a space approximately 0.252 inches wide between the center two air passages 77, 80, and by creating a space approximately 0.391 inches wide between the outer two air passages 76, 81. In this embodiment, the diffuser 70 includes five vertical straight diffuser vanes 72 and six semi-circular air passages 74, but in other exemplary embodiments, the diffuser 70 may have any number and any shape of diffuser vanes 72 and air passages 74.

In one exemplary embodiment, as seen in FIG. 7, the diffuser 70 may extend along the majority of the plenum 40, and may extend through the bend 48. More specifically, the diffuser 70 may extend from the inlet 42 to the plurality of channels 50, but may also be segmented into one or more parts. As seen in FIG. 7, the diffuser 70 may be located toward the inlet 42 of the plenum 40, but the diffuser 70 may be located in one or more segments anywhere before the plurality of channels 50.

In operation, one exemplary goal of the air purge system 20, as disclosed herein, is to prevent the contamination of the lens 54 of the optical sensor 30, by purging the ambient air in front of the lens 54, allthewhile minimizing the size of the optical unit. In one exemplary embodiment, a blower (not shown) forces filtered, uncontaminated air through a conduit (not shown), such as a hose or tube, into the inlet 42 of the plenum 40. The blower, which may be located some distance from the optical sensor 30, may be situated behind the optical sensor 30, and more importantly may be situated such that the size or footprint of the optical sensor housing is minimized, thereby allowing the optical sensor 30 to be utilized in a variety of applications, including those having a limited amount of space.

In one exemplary embodiment, the inlet 42 of the plenum 40, may be adapted to receive the conduit, which may allow for a smooth transition from the conduit to the plenum 40 without contaminating the filtered air. As the air enters the plenum, the diffuser 70, as shown in FIGS. 7 and 8, may distribute the air flow evenly through out the plenum 40. More specifically, as the air enters the diffuser 70, the air passages 74 may have substantially equal areas, thereby allowing equal amounts of airflow per area throughout the area of the plenum 40. The diffuser 70, as shown in FIGS. 6–8 may therefore distribute the airflow evenly throughout the plenum 40 and ultimately throughout the array of channels 50.

As the forced air continues along the inside of the plenum 40 and/or the diffuser 70, the air flow may encounter at least one change in direction, to overcome the difference in relative location of the blower to the second side 58 of the lens 54. In changing the direction of the airflow, fluid principles change what once was a laminar airflow into a turbulent airflow. As the turbulent airflow proceeds through the channels 52 of the array of parallel channels 50, the now turbulent airflow, reverts back to a substantially laminar air flow.

As the air exits the outlet 46, located at the end of the plenum 40 or at the array of parallel channels 50, the air may travel substantially parallel to the second side lens 58 and substantially perpendicular to the line of sight of the optical sensor 30. The outlet 46, being positioned a distance away from the lens 54, may allow the airflow to pass by the second side of the lens 58, allthewhile purging the air in the area in front of the lens 58, and thereby preventing any commingled contaminated air from reaching the lens 54.

The foregoing detailed description has been given for clearness of understanding only and no unnecessary limitations should be understood therefrom, as modifications will be obvious to those skilled in the art.

What is claimed is:

1. An air purge system for an optical sensor, comprising:
   a lens having a first side and a second side;
   an optical sensor positioned on the first side of the lens;
   a substantially laminar fluid stream located on the second side of the lens;
   a plenum including an inlet for a turbulent fluid stream and an outlet for the substantially laminar fluid stream, the plenum being adapted to direct the substantially laminar fluid stream parallel to the second side of the lens;
   an array of parallel channels being disposed between the inlet and the outlet for changing the turbulent fluid stream to the substantially laminar fluid stream; and
   a diffuser for diffusing the turbulent fluid stream prior to reaching the plurality of channels, wherein the diffuser includes a plurality of vanes oriented in a direction generally parallel to the flow of the turbulent fluid stream.

2. The air purge system of claim 1, wherein the inlet of the plenum is not in-line with outlet of the plenum.

3. The air purge system of claim 1, wherein the channels of the array are honeycomb shaped.

4. The air purge system of claim 1, wherein the channels of the array are grid shaped.

5. The air purge system of claim 1, wherein the channels of the array are tube shaped.

6. The air purge system of claim 1, wherein the fluid stream is located from the optical sensor a distance away such that ambient air does not contaminate the lens.

7. The air purge system of claim 1, wherein the array of parallel channels is created by a screen.

8. The air purge system of claim 1, wherein the array of parallel channels is created by a combination of at least one screen and other shaped channels.

9. The air purge system of claim 1, wherein the air purge system is disposed in a housing enclosing the optical sensor.

10. The air purge system of claim 1, wherein a portion of the plenum having the turbulent fluid stream is disposed along a length of the optical sensor.

11. The air purge system of claim 1, wherein the plenum includes a change in direction of approximately ninety degrees.

12. A method of purging air in front of an optical sensor, comprising:
    providing a lens having a first side and a second side, a plenum including an inlet, an array of parallel channels, and an outlet, an optical sensor located on the first side of the lens, and a diffuser located between the inlet and the outlet of the plenum;
    channeling a fluid stream through a diffuser and dividing the fluid stream with a plurality of vanes prior to entering the plurality of channels;
    changing the fluid stream from a laminar fluid stream to a turbulent fluid stream;
    channeling the turbulent fluid stream through the array of parallel channels, thereby changing the turbulent fluid stream to a substantially laminar fluid stream; and
    exiting the laminar fluid stream substantially parallel to the second side of the lens.

13. The method of claim 12, further including producing the fluid stream.

14. The method of claim 12, further including delivering the fluid stream into the inlet of the plenum.

15. The method of claim 12, wherein changing the fluid stream from a laminar fluid stream to a turbulent fluid stream includes changing the direction of the a laminar fluid stream via the plenum.

* * * * *

UNITED STATES PATENT AND TRADEMARK OFFICE
CERTIFICATE OF CORRECTION

PATENT NO. : 6,890,080 B2
DATED : May 10, 2005
INVENTOR(S) : Eugene F. Kalley et al.

It is certified that error appears in the above-identified patent and that said Letters Patent is hereby corrected as shown below:

Column 6,
Line 2, please delete "with outlet" and insert -- with the outlet --.
Line 50, please delete "the a laminar" and insert -- the laminar --.

Signed and Sealed this

Thirteenth Day of September, 2005

JON W. DUDAS
*Director of the United States Patent and Trademark Office*